US009887634B2

(12) United States Patent
Ramabhadran et al.

(10) Patent No.: US 9,887,634 B2
(45) Date of Patent: Feb. 6, 2018

(54) CIRCUITS AND METHODS FOR SYNCHRONOUS RECTIFICATION IN RESONANT CONVERTERS (71) Applicant: General Electric Company, Schenectady, NY (US)

(72) Inventors: Ramanujam Ramabhadran, Niskayuna, NY (US); Yehuda Daniel Levy, Lod (IL); Xu She, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 46 days.

(21) Appl. No.: 14/806,793

(22) Filed: Jul. 23, 2015

(65) Prior Publication Data
US 2017/0025965 A1 Jan. 26, 2017

(51) Int. Cl.
H02M 3/335 (2006.01)
H02M 1/00 (2006.01)
H02M 7/757 (2006.01)
H02M 5/42 (2006.01)
H02M 7/04 (2006.01)
H02M 7/68 (2006.01)

(52) U.S. Cl.
CPC ... H02M 3/33592 (2013.01); H02M 3/33546 (2013.01); H02M 2001/0058 (2013.01); Y02B 70/1433 (2013.01); Y02B 70/1475 (2013.01); Y02B 70/1491 (2013.01)

(58) Field of Classification Search
CPC ........... H02M 1/4241; H02M 3/33523; H02M 7/4815
USPC .......................... 363/21.02, 21.03, 78, 79, 88
See application file for complete search history.

(56) References Cited

U.S. PATENT DOCUMENTS

| 4,870,555 A | 9/1989 | White |
| 5,303,138 A | 4/1994 | Rozman |
| 6,462,965 B1 | 10/2002 | Uesono |

(Continued)

OTHER PUBLICATIONS

Fu et al., "1 MHz High Efficiency LLC Resonant Converters with Synchronous Rectifier," Power Electronics Specialists Conference, IEEE Xplore, Orlando, FL, Jun. 17-21, 2007, pp. 2404-2410.

(Continued)

*Primary Examiner* — Gary Nash
(74) *Attorney, Agent, or Firm* — Ziolkowski Patent Solutions Group, SC; Jean K. Testa (57) ABSTRACT

A resonant converter includes a primary stage having first and second switches coupled in series, a controller coupled to the first switch and the second switch to control operation thereof, a first transformer comprising a primary coil coupled to a node between the first and second switches, and a resonant inductor coupled to the primary coil of the first transformer. The resonant converter also includes a secondary stage having a second transformer formed of a primary coil coupled to the resonant inductor and a secondary coil comprising first and second coil sections, a third switch coupled to the first coil section of the secondary coil, and a fourth switch coupled to the second coil section of the secondary coil. A switch drive circuit is provided to drive the third and fourth switches for synchronous rectification, with the switch drive circuit comprising a secondary coil of the first transformer.

22 Claims, 5 Drawing Sheets

(56) References Cited

U.S. PATENT DOCUMENTS

| | | | |
|---|---|---|---|
| 6,473,317 | B1 | 10/2002 | Simopoulos |
| 7,184,280 | B2 | 2/2007 | Sun et al. |
| 7,706,156 | B2 | 4/2010 | Hsieh et al. |
| 8,064,229 | B2* | 11/2011 | Stuler .............. H02M 3/33592 363/21.02 |
| 8,134,851 | B2 | 3/2012 | Soldano et al. |
| 8,243,475 | B2 | 8/2012 | Zhou et al. |
| 8,854,840 | B2 | 10/2014 | Lin et al. |
| 2001/0022732 | A1* | 9/2001 | Yasumura ......... H02M 3/33569 363/16 |
| 2001/0036090 | A1* | 11/2001 | Halberstadt ........ H05B 41/2856 363/21.02 |
| 2005/0122753 | A1* | 6/2005 | Soldano ............ H02M 3/33592 363/125 |
| 2008/0137381 | A1* | 6/2008 | Beasley ............ H02M 3/33561 363/21.02 |
| 2008/0231211 | A1* | 9/2008 | Baarman ........... H02M 3/33523 315/294 |
| 2012/0287680 | A1* | 11/2012 | Luo ................... H02M 3/33592 363/21.02 |
| 2013/0127358 | A1* | 5/2013 | Yao ................... H05B 33/0815 315/201 |
| 2013/0163290 | A1* | 6/2013 | Moon ............... H02M 3/33592 363/21.02 |
| 2013/0258720 | A1* | 10/2013 | Worek ................... H01F 27/38 363/21.02 |
| 2013/0329464 | A1* | 12/2013 | Yang ................. H02M 3/33515 363/21.02 |

OTHER PUBLICATIONS

Moschopoulos et al., "A Series-Resonant DC/DC Converter with Asymmetrical PWM and Synchronous Rectification," IEEE 31st Annual Power Electronics Specialists Conference, IEEE Xplore, Jun. 18-23, 2000, Galway, vol. 3, pp. 1522-1527.

Glaser, "Analysis and design of a constant frequency diode-clamped series resonant converter," Thesis, The University of Arizona, 1991.

"Dual Smart Rectifier Driver IC," International Rectifier, Datasheet No. PD97382, Sep. 26, 2011, pp. 1-22.

Yang, "Topology Investigation of Front End DC/DC Power Conversion for Distributed Power System," Dissertation, Sep. 12, 2013, pp. 94-141.

Bildget, "Resonant Converter Topologies," STMicroelectronics, 1999, pp. 1-5.

Mammano, "Resonant Mode Converter Topologies," Unitrode Corporation, 1988, pp. 1-1-1-12.

Selders, Jr., "Synchronous Rectification in High-Performance Power Converter Design," Texas Instruments, 2007.

Fu, "Topology Investigation and System Optimization of Resonant Converters," Dissertation, Virginia Polytechnic Institute and State University, Feb. 4, 2010.

* cited by examiner

CIRCUITS AND METHODS FOR SYNCHRONOUS RECTIFICATION IN RESONANT CONVERTERS

BACKGROUND OF THE INVENTION

The present invention relates generally to rectification in converters and, more particularly, to circuits and methods for synchronous rectification in resonant converters.

Resonant converters are circuits often used to convert a direct current (DC) voltage in a DC power to an increased or decreased DC voltage, making the resonant converters DC-to-DC converters. The conversion process may include inverting the DC power to an alternating current (AC) power, increasing or decreasing the voltage of the AC power, and converting the AC power back to the DC power with the DC voltage increased or decreased. The process of converting a power from AC to DC is often called rectification. Resonant converters have different classifications based on how the resonant converters are constructed (for example, series loading versus parallel loading) and controlled (for example, fixed frequency versus variable frequency, zero-current switching (ZCS) versus zero-voltage switching (ZVS), and continuous resonance versus discontinuous resonance). One such classification of resonant converters is the clamped series resonant converter (CSRC).

Figure 1:
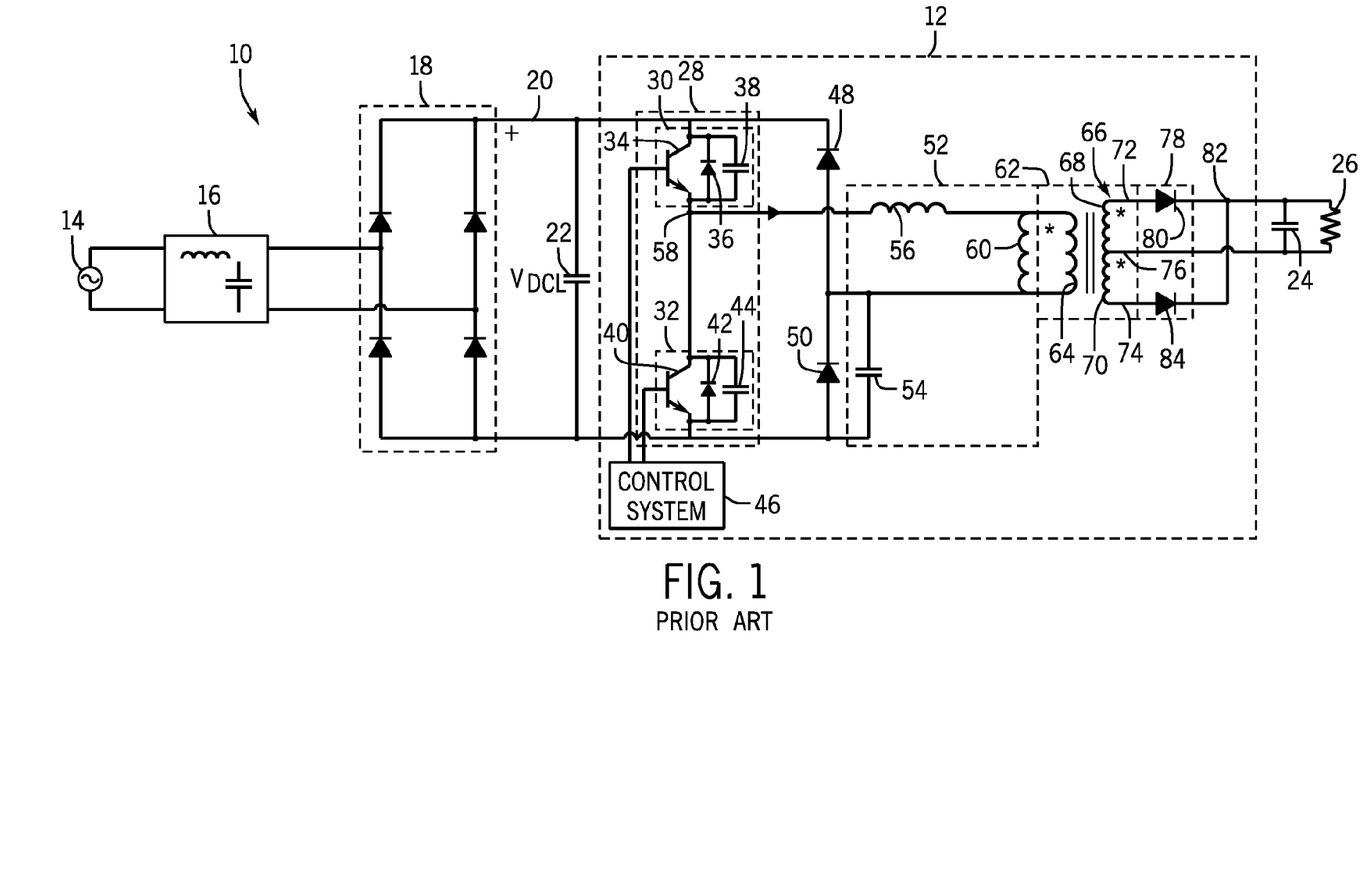
FIG. 1 is a power conversion circuit including a CSRC known to those skilled in the art.

Referring now to FIG. 1, a power conversion circuit 10 including a CSRC 12 known to those skilled in the art is shown. An AC power source 14 providing an AC power is coupled to CSRC 12 via three circuit components. AC power source 14 is coupled in series with an electromagnetic interference (EMI) filter 16 to remove EMI from the AC power provided by AC power source 14. EMI filter 16 is coupled to a four-diode full-wave bridge rectifier (diode bridge) 18 to rectify the AC power from AC power source 14 to a DC power after the AC power has passed through EMI filter 16. Diode bridge 18 outputs the DC power so a DC link voltage $V_{DCL}$ is provided to a DC link 20. Diode bridge 18 is coupled in parallel with a capacitor bank 22, which includes one or more capacitors, to smooth the DC link voltage, with the smoothed voltage then being provided to CSRC 12. CSRC 12 acts as a DC-to-DC converter in this case. As will be described further below, CSRC 12 inverts the DC power from diode bridge 18 to an AC power, increases the voltage of the AC power, and converts the AC power back to the DC power with an increased DC voltage. The output of CSRC 12 is coupled to a filter capacitor 24, which is coupled in parallel with a load 26.

CSRC 12 includes a half-bridge circuit 28 with two switches 30, 32. Switches 30, 32 may be any appropriate electronic switches such as metal-oxide-semiconductor field-effect transistors (MOSFETs), for example. Switches 30, 32 are coupled in series with each other and in parallel with capacitor bank 22. Switch 30 includes a switch body 34 in parallel with a body diode 36 and a parasitic junction capacitor 38, and switch 32 is coupled in parallel with a switch body 40 in parallel with a body diode 42 and a parasitic junction capacitor 44. Switches 30, 32 are controlled by a control system 46, which may include any appropriate electronic controller, such as an integrated circuit, for example. Control system 46 controls switches 30, 32 to invert the DC power from diode bridge 18 to an AC power. Switches 30, 32 are also coupled in parallel with two clamping diodes 48, 50, which are coupled in series with each other.

CSRC 12 also includes a resonant circuit 52, which includes a resonant capacitor 54 coupled in parallel with clamping diode 50, a resonant inductor 56 coupled to a node 58 between switches 30, 32, and a magnetizing inductor 60 coupled in series with resonant capacitor 54 and resonant inductor 56. A voltage transformer 62 configured as a single transformer hybrid coil is coupled in parallel with magnetizing inductor 60. While magnetizing inductor 60 is shown as a discrete circuit element coupled in parallel with voltage transformer 62, it is well known in the art that magnetizing inductor 60 is intrinsic to voltage transformer 62 and represents the magnetization of the core of voltage transformer 62. Voltage transformer 62 includes a primary coil 64 coupled in parallel with magnetizing inductor 60 and a secondary coil 66 isolated from primary coil 64. Secondary coil 66 includes a first coil section 68 and a second coil section 70 so secondary coil 66 includes three outputs 72, 74, and 76. A power input into primary coil 64 will appear at outputs 72, 74, but because output 76 is bridged between first coil section 68 and second coil section 70, no power will appear at output 76. Voltage transformer 62 transforms the AC power provided by switches 30, 32 and input into primary coil 64 into an AC power with a scaled voltage output at outputs 72, 74.

Outputs 72, 74 are coupled to a full-wave-rectifier circuit 78, which includes a rectification diode 80 coupled between output 72 and a node 82 and a rectification diode 84 coupled between output 74 and node 80. The anode of rectification diode 80 is coupled to output 72, and the anode of rectification diode 84 is coupled to output 74. The cathodes of rectification diodes 80, 84 are coupled to node 82. The full-wave-rectifier circuit 78 rectifies the AC power with the increased voltage output at outputs 72, 74 because of the configuration of rectification diodes 80, 84. Since rectification diodes 80, 84 are only activated by a positive voltage drop, the voltage across load 26 is always positive. Filter capacitor 24 and load 26 are each coupled between node 82 and output 76.

While rectification diodes 80, 84 of full-wave-rectifier circuit 78 are effective to provide a DC power to load 26, there are efficiency problems associated with diode rectification. For example, a forward voltage drop across a diode becomes significant when the output voltage drops, reducing a converter's efficiency. Therefore, many skilled in the art have turned to synchronous rectification, which includes using rectification switches in place of rectification diodes. However, drive circuits for rectification switches are often quite complicated and large, increasing the cost and energy consumption of using rectification switches. Therefore, the efficiency gained by replacing rectification diodes with rectification switches is lost, which leads to many skilled in the art choosing to keep the rectification diodes in their resonant converters.

It would therefore be desirable to provide a drive circuit for synchronous rectification in resonant converters that is both simplified and smaller to reduce cost and energy consumption.

BRIEF DESCRIPTION OF THE INVENTION

Embodiments of the invention provide a resonant converter with synchronous rectification and methods of operation thereof. A switch drive circuit controls rectification switches to synchronously rectify an AC power. The switch drive circuit may include a transformer such as a current transformer, for example, or a control system such as an integrated circuit, for example.

In accordance with one aspect of the invention, a resonant converter includes a resonant converter primary stage having a first switch, a second switch coupled in series with the first switch, a controller coupled to the first switch and the second switch and programmed to control operation of the first switch and the second switch, a first transformer comprising a primary coil coupled to a node between the first switch and the second switch, and a resonant inductor coupled to the primary coil of the first transformer. The resonant converter also includes a resonant converter secondary stage having a second transformer formed of a primary coil coupled to the resonant inductor and a secondary coil comprising a first coil section and a second coil section coupled to the first coil section, a third switch coupled to the first coil section of the secondary coil of the second transformer, and a fourth switch coupled to the second coil section of the secondary coil of the second transformer. The resonant converter further includes a switch drive circuit configured to drive the third switch and the fourth switch for synchronous rectification, wherein the switch drive circuit comprises a secondary coil of the first transformer.

In accordance with another aspect of the invention, a method for synchronous rectification in a resonant converter includes providing a resonant converter primary stage by providing a primary pair of switches, coupling a controller to the primary pair of switches, the controller configured to control operation of the primary pair of switches, coupling a primary coil of a current transformer to the primary pair of switches, and coupling a primary coil of a voltage transformer to the current transformer. The method also includes providing a resonant converter secondary stage by providing a secondary coil of the voltage transformer and coupling a pair of secondary switches to the secondary coil of the transformer. The method further includes coupling a switch drive circuit to the pair of secondary switches, the switch drive circuit comprising a secondary coil of the current transformer, providing power to the resonant converter primary stage, and controlling the primary pair of switches with the controller to direct power through the primary coil of the current transformer and the primary coil of the voltage transformer, wherein the power flowing through the primary coil of the voltage transformer causes power to flow through the secondary coil of the voltage transformer, wherein the power flowing through the primary coil of the current transformer causes power to flow through the secondary coil of the current transformer, and wherein the power flowing through the secondary coil of the current transformer causes the switch drive circuit to drive the pair of secondary switches to direct the power flowing through the secondary coil of the voltage transformer to a load.

In accordance with yet another aspect of the invention, a clamped series resonant converter includes a half bridge circuit comprising a first switch and a second switch coupled in series with the first switch, a first controller coupled to the half bridge circuit and programmed to control the half bridge circuit, and a pair of diodes coupled in parallel with the half bridge circuit, the pair of diodes comprising a first diode in series with a second diode. The clamped series resonant converter also includes a capacitor coupled in parallel with the second diode of the pair of diodes, an inductor coupled to a node between the first switch of the half bridge circuit and the second switch of the half bridge circuit, and a transformer comprising a primary coil coupled to the inductor and to a node between the first diode and the second diode and a secondary coil comprising a first coil section and a second coil section coupled to the first coil section. The clamped series resonant converter further includes a pair of switches including a third switch coupled to the first coil section of the secondary coil of the transformer and a fourth switch coupled to the second coil section of the secondary coil of the transformer, a first current sensor coupled to the third switch for sensing the current through the third switch, a second current sensor coupled to the fourth switch for sensing the current through the fourth switch, and a second controller coupled to the first current sensor, the second current sensor, and the pair of switches and programmed to control the pair of switches synchronously with the half bridge circuit based on the current sensed by the first current sensor and the second current sensor.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

The embodiments of the invention set forth herein relate to circuits and methods for achieving synchronous rectification in resonant converters. A switch drive circuit is provided for controlling rectification switches in a resonant converter to rectify an AC power synchronously with a half bridge circuit. While the systems and methods for synchronous rectification are referred to herein with respect to clamped series resonant converters, the circuits and methods for synchronous rectification may be used in other types of resonant converters.

Figure 2:
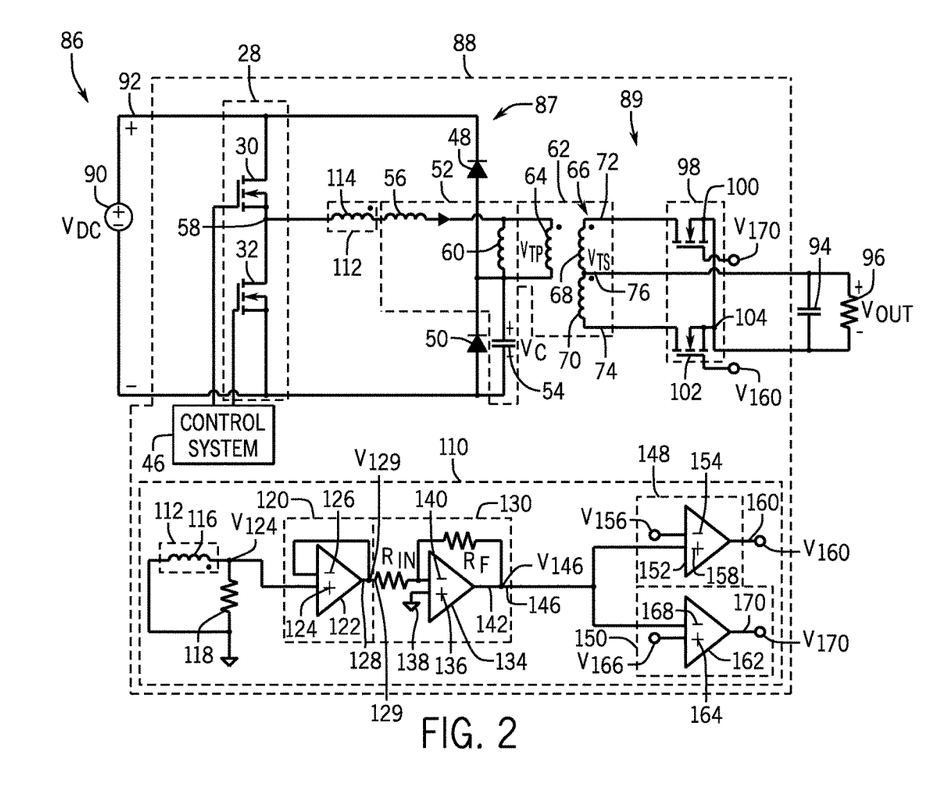
FIG. 2 is a power conversion circuit including a CSRC, according to an embodiment of the invention.

Referring to FIG. 2, a power conversion circuit 86 including a CSRC 88 is shown, according to an embodiment of the invention. A DC power source 90 provides a DC voltage $V_{DC}$ to a DC link 92 coupled to CSRC 88. The output of CSRC 88 is coupled to a voltage-stabilizing capacitor 94, which is coupled in parallel with a load 96. CSRC 88 includes a number of components similar to components of CSRC 12 of FIG. 1, and thus numbers used to indicate components in FIG. 1 will also be used to indicate similar components in FIG. 2. CSRC 88 includes a primary stage 87 and a secondary stage 89 isolated from primary stage 87. Primary stage 87 includes half bridge circuit 28 of CSRC 12 including switches 30, 32 coupled to control system 46. Each of switches 30, 32 is represented as a single switch component in CSRC 88 as opposed to three switch components as shown in CSRC 12 (FIG. 1). Primary stage 87 also includes clamping diodes 48, 50, resonant circuit 52 including resonant capacitor 54, resonant inductor 56, and magnetizing inductor 60, and primary coil 64 of voltage transformer 62. In some embodiments, resonant capacitor 54 is in a split arrangement. In the split arrangement, the capacitance of resonant capacitor 54 is decreased by 50%, and a second resonant capacitor (not shown) with a capacitance equal to the capacitance of resonant capacitor 54 is coupled in parallel with clamping diode 48. This split arrangement may decrease the ripple current by 50%. A current $i_L$ flows through the resonant inductor 56, a voltage $V_C$ exists across resonant capacitor 54, and a voltage $V_{TP}$ exists across primary coil 64. Secondary stage 89 includes secondary coil 66 of transformer 62 including first coil section 68, second coil section 70, and outputs 72, 74, 76. However, while CSRC 12 (FIG. 1) is configured for diode rectification, CSRC 88 of FIG. 2 is configured for synchronous rectification.

As further shown in FIG. 2, secondary stage 89 also includes a synchronous rectifier circuit 98 including rectification switches 100, 102. Rectification switches 100, 102 may be any appropriate electronic switches such as metal-oxide-semiconductor field-effect transistors (MOSFETs), for example. Rectification switch 100 is coupled a node 104 and to output 72. Rectification switch 102 is coupled to node 104 and to output 74. Synchronous rectifier circuit 98 is controlled by a switch drive circuit 110, with the switch drive circuit 110 being isolated from primary stage 87.

Primary stage 87 of CSRC 88 includes a current transformer 112 including a primary coil 114 coupled between node 58 between switches 30, 32 and resonant inductor 56. Current transformer 112 also includes a secondary coil 116 that powers switch drive circuit 110. Current transformer 112 typically includes a magnetic core. However, in an alternative embodiment, current transformer 112 includes an air core, which may allow for higher switching frequencies. Also, in an alternative embodiment, primary coil 114 of current transformer 112 is integrated with resonant inductor 56 or resonant circuit 52. Current transformer 112 may be integrated with resonant inductor 56 in a split bobbin arrangement so that current transformer 112 and resonant inductor 56 have a common core. Secondary coil 116 is coupled in parallel with a resistor 118 and in series with a voltage follower circuit 120. Voltage follower circuit 120 includes an operational amplifier (op-amp) 122. Op-amp 122 includes a non-inverting input 124 coupled to secondary coil 116 and an inverting input 126 coupled to an output 128 of op-amp 122. Voltage follower circuit 120 is configured to act as a unity buffer amplifier. An output 129 of voltage follower circuit 120 outputs a voltage $V_{129}$ equal to a voltage $V_{124}$ that secondary coil 116 inputs into non-inverting input 124 ($V_{129}=V_{124}$), but any loading effects are eliminated.

Voltage follower circuit 120 is coupled to an inverting amplifier circuit 130. Inverting amplifier circuit 130 includes an input resistor $R_{in}$ coupled to output 129 and an op-amp 134 that includes a non-inverting input 136 coupled to ground 138. Op-amp 134 also includes an inverting input 140 and an output 142 coupled to inverting input 140 through a feedback resistor $R_f$. Inverting amplifier circuit 130 is configured so that an output 146 of inverting amplifier circuit 130 outputs a voltage $V_{146}$ equal to voltage $V_{129}$ output by voltage follower circuit 120 multiplied by a gain $G_{130}$ of inverting amplifier circuit 130 ($V_{146}=G_{130}*V_{129}$). Gain $G_{130}$ of inverting amplifier circuit 130 is equal to the negative value of the resistance of feedback resistor $R_f$ divided by the resistance of input resistor $R_{in}$, ($G_{130}=-R_f/R_{in}$).

Inverting amplifier circuit 130 is coupled to comparator circuits 148, 150. Comparator circuit 148 includes an op-amp 152. Op-amp 152 includes an inverting input 154 coupled to a positive DC reference voltage $V_{156}$, a non-inverting input 158 coupled to output 146, and an output 160 coupled to rectification switch 102. Op-amp 152 is configured so output 160 outputs a voltage $V_{160}$ equal to a voltage $V_{158}$ input into non-inverting input 158 minus a voltage $V_{154}$ input into inverting input 154 multiplied by a gain of op-amp 152 ($V_{160}=G_{152}*(V_{158}-V_{154})$). Therefore, output 160 outputs gain $G_{152}$ multiplied by voltage $V_{146}$ output by inverting amplifier circuit 130 minus positive DC reference voltage $V_{156}$ ($V_{160}=G_{152}*(V_{146}-V_{156})$). Therefore, output 160 outputs a positive voltage $V_{160}$ to rectification switch 102 to switch on rectification switch 102 when voltage $V_{146}$ is greater than positive DC reference voltage $V_{156}$ ($V_{160}$ is positive when $V_{146}>V_{156}$), and output 160 outputs a negative voltage $V_{160}$ to rectification switch 102 to switch off rectification switch 102 when voltage $V_{146}$ is less than positive DC reference voltage $V_{156}$ ($V_{160}$ is negative when $V_{146}<V_{156}$).

Comparator circuit 150 includes an op-amp 162 having a non-inverting input 164 coupled to a negative DC reference voltage $V_{166}$, an inverting input 168 coupled to output 146, and an output 170 coupled to rectification switch 100. Op-amp 162 is configured so output 170 outputs a voltage $V_{170}$ equal to a voltage $V_{164}$ input into non-inverting input 164 minus a voltage $V_{168}$ input into inverting input 168 multiplied by a gain $G_{162}$ of op-amp 162 ($V_{170}=G_{162}*(V_{164}-V_{168})$). Therefore, output 170 outputs gain $G_{162}$ multiplied by negative DC reference voltage $V_{166}$ minus voltage $V_{146}$ output by inverting amplifier circuit 130 ($V_{170}=G_{162}*(V_{166}-V_{146})$). Therefore, output 170 outputs a positive voltage $V_{170}$ to rectification switch 100 to switch on rectification switch 100 when voltage $V_{146}$ is less than negative DC reference voltage $V_{166}$ ($V_{170}$ is positive when $V_{166}>V_{146}$), and output 170 outputs a negative voltage $V_{170}$ to rectification switch 100 to switch off rectification switch 100 when voltage $V_{146}$ is greater than negative DC reference voltage $V_{166}$ ($V_{170}$ is negative when $V_{146}>V_{166}$).

Figure 3:
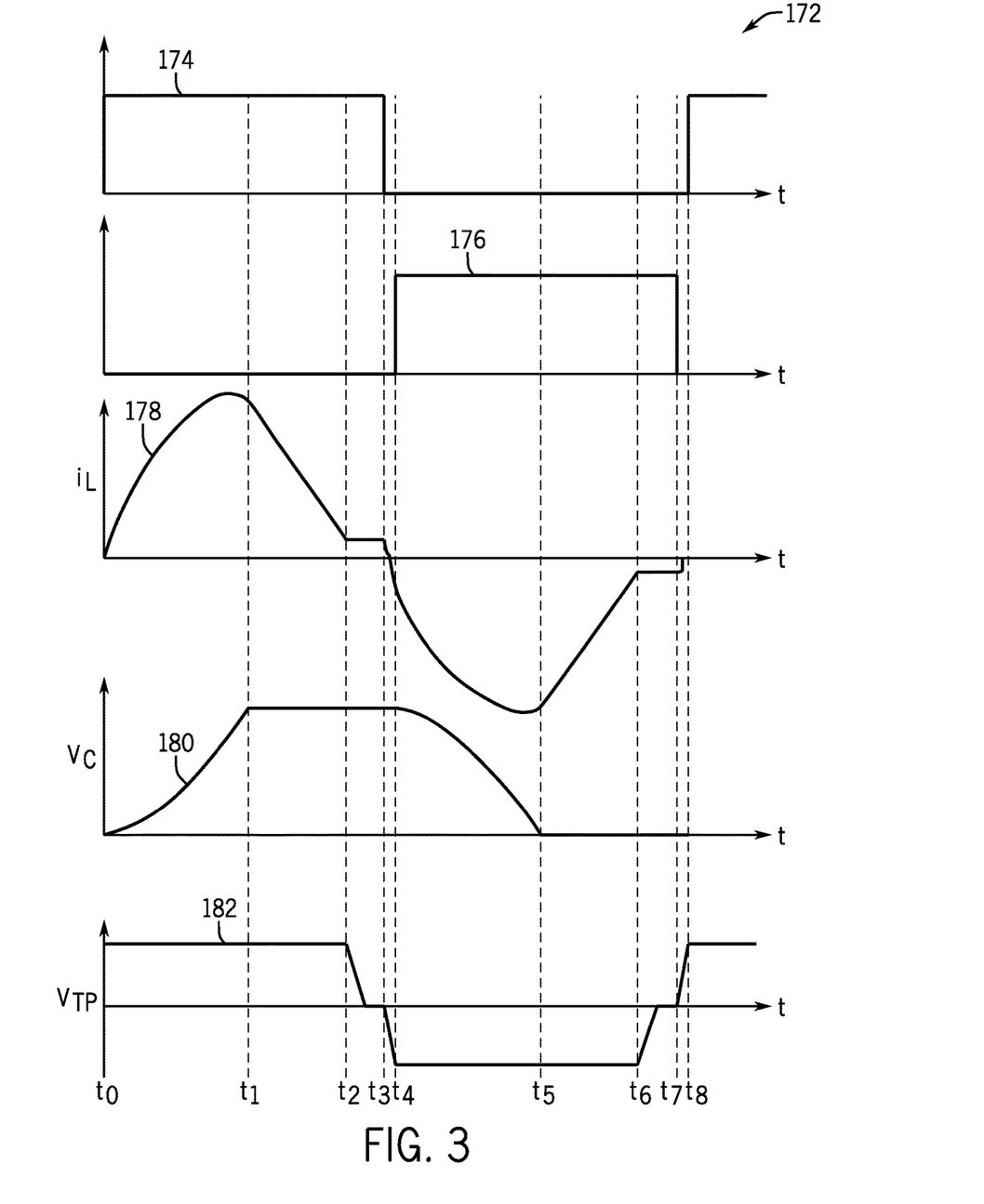
FIG. 3 is a diagram displaying the operational waveforms for the CSRC of FIG. 2, according to an embodiment of the invention.

Referring now to FIG. 3, and with continued reference to FIG. 2, a diagram 172 is provided that illustrates the operation of CSRC 88. Switching waveforms 174, 176 correspond to the operation of switches 30, 32, respectively, of FIG. 2. As shown, switching waveforms 174, 176 of switches 30, 32 complement each other so switch 30 is never switched on at the same time as switch 32 to prevent short circuits. In fact, a dead-time is incorporated into switching waveforms 174, 176 so that neither switch 30 nor switch 32 is switched on from time $t_3$ to time $t_4$ and from time $t_7$ to time $t_8$. Switching waveforms 174, 176 control current waveform 178 corresponding to current $i_L$ of FIG. 2 and voltage waveforms 180, 182 corresponding to voltage $V_C$ and voltage $V_{TP}$ of FIG. 2, respectively, according to a pattern from a time $t_0$ to a time $t_8$.

At time $t_0$, switch 30 is switched on. Because switch 30 is switched on, current $i_L$ is increasing sinusoidally, voltage $V_C$ is increasing exponentially, and voltage $V_{TP}$ has increased to $V_{DC}$, where voltage $V_{TP}$ is clamped. While voltage $V_{TP}$ is positive, voltage transformer 62 provides a negative secondary voltage $V_{TS}$ between output 74 and output 76 of secondary coil 66 of voltage transformer 62. Because current $i_L$ is positive, current transformer 112 provides a negative secondary voltage $V_{124}$ and current to switch drive circuit 110. Voltage follower circuit 120 receives the negative secondary voltage $V_{124}$ from secondary coil 116 of current transformer 112, and output 129 of voltage follower circuit 120 outputs negative voltage $V_{129}$ after removing loading effects from negative secondary voltage $V_{124}$. Inverting amplifier circuit 130 receives negative voltage $V_{129}$ from voltage follower circuit 120, and output 146 of inverting amplifier circuit 130 outputs a positive voltage $V_{146}$ because, as stated above, $V_{146}=-R_f/R_{in}*V_{129}$. Comparator circuit 148 receives positive voltage $V_{146}$ from inverting amplifier circuit 130, and output 160 of comparator circuit 148 outputs a positive voltage $V_{160}$ to switch on rectification switch 102 because $V_{160}=G_{152}*(V_{146}-V_{156})$ and $V_{146}$ is greater than $V_{156}$. Comparator circuit 150 receives positive voltage $V_{146}$ from inverting amplifier circuit 130, and output 170 of comparator circuit 150 outputs a negative voltage $V_{170}$ to switch off rectification switch 100 because $V_{170}=G_{162}*(V_{166}-V_{146})$ and $V_{166}$ is less than $V_{146}$. Therefore, rectification switch 102 is switched on, and rectification switch 100 is switched off. Because a positive voltage $V_{TS}$ exists between output 72 and output 74, a negative voltage exists between output 74 and output 76, causing a positive voltage $V_{OUT}$ to exist across load 96.

When voltage $V_C$ has increased to $V_{DC}$ at a time $t_1$, clamping diode 48 of FIG. 2 turns on, clamping voltage $V_C$ to $V_{DC}$, and current $i_L$ begins to decrease linearly. Current $i_L$ is still positive, so voltage $V_{TP}$ remains at $V_{DC}$, rectification switch 102 remains switched on, and rectification switch 100 remains switched off Because the switching period of switches 30, 32 is longer than the resonant period between resonant capacitor 54 and resonant inductor 56, current $i_L$ decreases to the level of current flowing through magnetizing inductor 60 (the magnetizing current) before switch 30 is switched off. When current $i_L$ reaches the magnetizing current at a time $t_2$, voltage $V_C$ remains at $V_{DC}$, and voltage $V_{TP}$ decreases linearly to zero volts. While current $i_L$ is at a constant level between time $t_2$ and time $t_3$, voltage $V_{TS}$ and voltage $V_{124}$ fall to zero volts, and rectification switches 100, 102 are switched off.

At a time $t_3$, switch 30 is switched off, and voltage $V_C$ begins to decrease exponentially. Because resonant capacitor 54 is discharging, Current $i_L$ begins to decrease sinusoidally, and voltage $V_{TP}$ begins to decrease linearly to $-V_{DC}$. While voltage $V_{TP}$ is negative, voltage transformer 62 provides a negative secondary voltage $V_{TS}$ between output 72 and output 76 of secondary coil 66 of voltage transformer 62. Because current $i_L$ is negative, current transformer 112 provides a positive secondary voltage $V_{124}$ and current to switch drive circuit 110. Voltage follower circuit 120 receives the positive secondary voltage $V_{124}$ from secondary coil 116 of current transformer 112, and output 129 of voltage follower circuit 120 outputs positive voltage $V_{129}$ after removing loading effects from positive secondary voltage $V_{124}$. Inverting amplifier circuit 130 receives positive voltage $V_{129}$ from voltage follower circuit 120, and output 146 of inverting amplifier circuit 130 outputs a negative voltage $V_{146}$ because, as stated above, $V_{146}=-R_f/R_{in}*V_{129}$. Comparator circuit 148 receives negative voltage $V_{146}$ from inverting amplifier circuit 130, and output 160 of comparator circuit 148 outputs a negative voltage $V_{160}$ to switch off rectification switch 102 because $V_{160}=G_{152}*(V_{146}-V_{156})$ and voltage $V_{146}$ is less than voltage $V_{156}$. Comparator circuit 150 receives negative voltage $V_{146}$ from inverting amplifier circuit 130, and output 170 of comparator circuit 150 outputs a positive voltage $V_{170}$ to switch on rectification switch 100 because $V_{170}=G_{162}*(V_{166}-V_{146})$ and voltage $V_{166}$ is greater than voltage $V_{146}$. Therefore, rectification switch 100 is switched on, and rectification switch 102 is switched off. Because a negative voltage $V_{TS}$ exists between output 72 and output 74, a negative voltage exists between output 72 and output 76, causing a positive voltage $V_{OUT}$ to exist across load 96.

At a time $t_4$, switch 32 is switched on, and voltage $V_{TP}$ has decreased to $-V_{DC}$. Also at time $t_4$, current $i_L$ and voltage $V_C$ continue to decrease as before. When voltage $V_C$ has decreased to zero at a time $t_5$, clamping diode 50 of FIG. 2 turns on, clamping voltage $V_C$ to zero volts, and current $i_L$ begins to increase linearly. Also at time $t_5$, voltage $V_{TP}$ remains at $-V_{DC}$, rectification switch 100 remains switched on, and rectification switch 102 remains switched off. Because the switching period of switches 30, 32 is longer than the resonant period between resonant capacitor 54 and resonant inductor 56, current $i_L$ increases to the magnetizing inductor current before switch 32 is switched off.

When current $i_L$ reaches the magnetizing current at a time $t_6$, voltage $V_C$ remains at zero volts, and voltage $V_{TP}$ increases linearly to zero volts. While current $i_L$ is at a constant level between time $t_6$ and time $t_7$, voltage $V_{TS}$ and voltage $V_{124}$ rise to zero volts, and rectification switches 100, 102 are switched off. When switch 32 is switched off at a time $t_7$, current $i_L$ begins to increase to zero volts, and voltage $V_{TP}$ begins to increase linearly to $V_{DC}$, which causes switch drive circuit 110 to switch on rectification switch 102 and switch off rectification switch 100 as before. At time $t_8$, switch 30 is switched on, and the pattern established from time $t_0$ to time $t_8$ repeats.

As described above with respect to FIGS. 1-2, switch drive circuit 110 is configured to drive rectification switch 102 to operate synchronously with switch 30 and rectification switch 100 to operate synchronously with switch 32. In other words, rectification switch 102 is only switched on when switch 30 is switched on, and rectification switch 100 is only switched on when switch 32 is switched on. The operation of switch drive circuit 110 for synchronous rectification is designed to prevent rectification switches 100, 102 from switching on at the same time.

Figure 4:
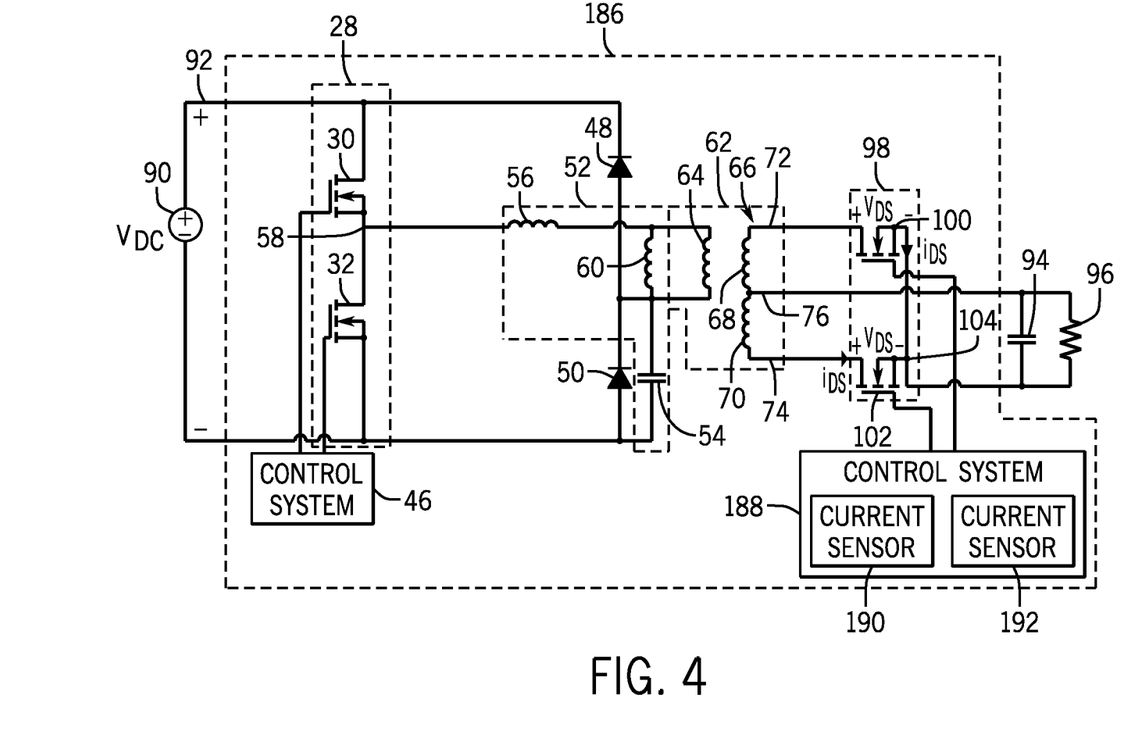
FIG. 4 is a power conversion circuit including a CSRC, according to another embodiment of the invention.

Referring now to FIG. 4, a power conversion circuit 184 including a CSRC 186 is shown according to another embodiment of the invention. CSRC 186 includes a number of components similar to components of CSRC 12 of FIG. 1 and CSRC 88 of FIG. 2, and thus numbers used to indicate components in FIGS. 1 and 2 will also be used to indicate similar components in FIG. 4. DC power source 90 provides DC voltage $V_{DC}$ to DC link 92 coupled to CSRC 186. The output of CSRC 186 is coupled to voltage-stabilizing capacitor 94, which is coupled in parallel with load 96.

CSRC 186 includes half bridge circuit 28 of CSRC 12 (FIG. 1) and CSRC 88 (FIG. 2), with the half bridge circuit 28 including switches 30, 32 coupled to control system 46. Each of switches 30, 32 is represented as a single switch component as described with respect to FIG. 2. CSRC 186 also includes clamping diodes 48, 50, resonant circuit 52 including resonant capacitor 54, resonant inductor 56, and magnetizing inductor 60, and transformer 62 including primary coil 64 and secondary coil 66. In some embodiments, resonant capacitor 54 is in the split arrangement described above with respect to CSRC 88 of FIG. 2. Secondary coil 66 includes first coil section 68, second coil section 70, and outputs 72, 74, 76. Like CSRC 88, CSRC 186 is configured for synchronous rectification via synchronous rectifier circuit 98 including rectification switches 100, 102. Rectification switches 100, 102 may be any appropriate electronic switches, such as metal-oxide-semiconductor field-effect transistors (MOSFETs), for example. Rectification switch 100 is coupled to a node 104 and to output 72. Rectification switch 102 is coupled to node 104 and to output 74. Synchronous rectifier circuit 98 is controlled by a control system 188. According to one embodiment, control system 188 may include an integrated circuit such as an IR1168S integrated circuit, for example. Control system 188 also includes two current sensors 190, 192 that sense current through rectification switches 100, 102, respectively. Control system 188 is configured to switch on rectification switches 100, 102 in close proximity of a zero current transition to obtain ZCS.

Figure 5:
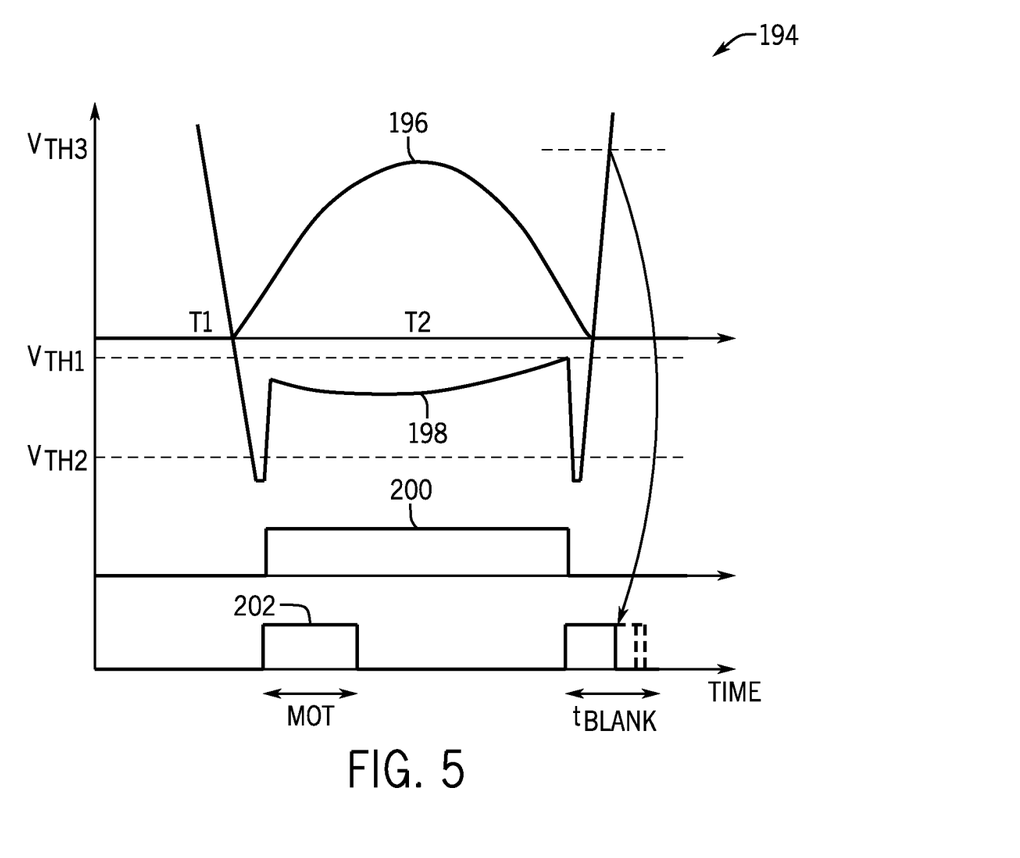
FIG. 5 is a diagram displaying the operational waveforms for the CSRC of FIG. 4, according to an embodiment of the invention.

The operation of CSRC 186 will be discussed in conjunction with FIG. 5. FIG. 5 shows a diagram 194 of the operation of rectification switch 100 of synchronous rectifier circuit 98 of CSRC 186 of FIG. 4. Rectification switch 100 is switched on and off synchronously with switch 32 of half bridge circuit 28 of CSRC 186. While diagram 194 only displays the operation of rectification switch 100, diagram 194 also applies to rectification switch 102, which is switched on and off synchronously with switch 30 of half bridge circuit 28 of CSRC 186. Current waveform 196 corresponds to a current $i_{DS}$ flowing through rectification switch 100. Voltage waveform 198 corresponds to a voltage $V_{DS}$ across rectification switch 100. Switching waveform 200 corresponds to the operation of rectification switch 100. Switching waveform 202 corresponds to a blanking period used to maintain rectification switch 100 switched on for a minimum amount of time.

When the conduction phase of rectification switch 100 is initiated, current $i_{DS}$ will start flowing through a body diode (not shown) of rectification switch 100, generating a negative voltage $V_{DS}$ across rectification switch 100. The body diode generally has a much higher voltage drop than the one caused by rectification switch 100 on resistance, and therefore will trigger a turn-on threshold voltage $V_{TH2}$. When turn-on threshold voltage $V_{TH2}$ is triggered, control system 188 will switch on rectification switch 100, which will, in turn, cause voltage $V_{DS}$ to drop down to $I_D*R_{DSON}$, the resistance across rectification switch 100 when rectification switch 100 is switched on. The voltage drop of voltage $V_{DS}$ is usually accompanied by some amount of ringing that could trigger the input comparator to turn off Therefore, the fixed Minimum On Time (MOT) blanking period is used that will maintain the power MOSFET on for a minimum amount of time. The fixed MOT limits the minimum conduction time of rectification switch 100 and hence, the maximum switching frequency of the CSRC 186.

Once rectification switch 100 has been switched on, rectification switch 100 will remain on until the rectified current decays to where voltage $V_{DS}$ crosses a turn-off threshold voltage $V_{TH1}$. Since the device currents are sinusoidal here, the voltage $V_{DS}$ will cross turn-off threshold voltage $V_{TH1}$ with a relatively low dV/dt. Once turn-off threshold voltage $V_{TH1}$ is crossed, the current will start flowing again through the body diode, causing the voltage $V_{DS}$ to jump negative. Depending on the amount of residual current, voltage $V_{DS}$ may once again trigger turn-on threshold voltage $V_{TH2}$; hence, turn-on threshold voltage $V_{TH2}$ is blanked for a time duration $t_{BLANK}$ after turn-off threshold voltage $V_{TH1}$ is triggered. When the voltage $V_{DS}$ crosses a positive reset threshold $V_{TH3}$, $t_{BLANK}$ is terminated and control system 188 is ready for next conduction cycle.

Beneficially, embodiments of the inventions thus provide a resonant converter with synchronous rectification. The synchronous rectification is provided by rectification switches and a switch drive circuit. In a first embodiment, the switch drive circuit includes a current transformer that provides a switching voltage to the rectification switches to switch on or off through a voltage follower circuit, an inverting amplifier circuit, and a comparator circuit for each rectification switch. The switch drive circuit is configured to provide switching signals to the rectification switches so the rectification switches synchronously rectify an AC power to a DC power. In a second embodiment, the switch drive circuit includes a control system including a current sensor for each rectification switch. The control system switches on or off the rectification switches based on the current sensed by the current sensors. The first embodiment of the resonant converter may provide a faster method of synchronous rectification than the second embodiment, but the first embodiment may be more costly. The second embodiment may work slower than the first embodiment, but the second embodiment may be more efficient than the first embodiment. However, both the first and second embodiments of the resonant converter with synchronous rectification provide simplified and smaller constructions than previous resonant converters with synchronous rectification. Therefore, the embodiments of the resonant converter with synchronous rectification reduce manufacturing costs and energy consumption associated with implementing synchronous rectification in resonant converters.

Therefore, according to one embodiment of the present invention, a resonant converter includes a resonant converter primary stage having a first switch, a second switch coupled in series with the first switch, a controller coupled to the first switch and the second switch and programmed to control operation of the first switch and the second switch, a first transformer comprising a primary coil coupled to a node between the first switch and the second switch, and a resonant inductor coupled to the primary coil of the first transformer. The resonant converter also includes a resonant converter secondary stage having a second transformer formed of a primary coil coupled to the resonant inductor and a secondary coil comprising a first coil section and a second coil section coupled to the first coil section, a third switch coupled to the first coil section of the secondary coil of the second transformer, and a fourth switch coupled to the second coil section of the secondary coil of the second transformer. The resonant converter further includes a switch drive circuit configured to drive the third switch and the fourth switch for synchronous rectification, wherein the switch drive circuit comprises a secondary coil of the first transformer.

According to another embodiment of present invention, a method for synchronous rectification in a resonant converter includes providing a resonant converter primary stage by providing a primary pair of switches, coupling a controller to the primary pair of switches, the controller configured to control operation of the primary pair of switches, coupling a primary coil of a current transformer to the primary pair of switches, and coupling a primary coil of a voltage transformer to the current transformer. The method also includes providing a resonant converter secondary stage by providing a secondary coil of the voltage transformer and coupling a pair of secondary switches to the secondary coil of the transformer. The method further includes coupling a switch drive circuit to the pair of secondary switches, the switch drive circuit comprising a secondary coil of the current transformer, providing power to the resonant converter primary stage, and controlling the primary pair of switches with the controller to direct power through the primary coil of the current transformer and the primary coil of the voltage transformer, wherein the power flowing through the primary coil of the voltage transformer causes power to flow through the secondary coil of the voltage transformer, wherein the power flowing through the primary coil of the current transformer causes power to flow through the secondary coil of the current transformer, and wherein the power flowing through the secondary coil of the current transformer causes the switch drive circuit to drive the pair of secondary switches to direct the power flowing through the secondary coil of the voltage transformer to a load.

According to yet another embodiment of the present invention, a clamped series resonant converter includes a half bridge circuit comprising a first switch and a second switch coupled in series with the first switch, a first controller coupled to the half bridge circuit and programmed to control the half bridge circuit, and a pair of diodes coupled in parallel with the half bridge circuit, the pair of diodes comprising a first diode in series with a second diode. The clamped series resonant converter also includes a capacitor coupled in parallel with the second diode of the pair of diodes, an inductor coupled to a node between the first switch of the half bridge circuit and the second switch of the half bridge circuit, and a transformer comprising a primary coil coupled to the inductor and to a node between the first diode and the second diode and a secondary coil comprising a first coil section and a second coil section coupled to the first coil section. The clamped series resonant converter further includes a pair of switches including a third switch coupled to the first coil section of the secondary coil of the transformer and a fourth switch coupled to the second coil section of the secondary coil of the transformer, a first current sensor coupled to the third switch for sensing the current through the third switch, a second current sensor coupled to the fourth switch for sensing the current through the fourth switch, and a second controller coupled to the first current sensor, the second current sensor, and the pair of switches and programmed to control the pair of switches synchronously with the half bridge circuit based on the current sensed by the first current sensor and the second current sensor.

The present invention has been described in terms of the preferred embodiment, and it is recognized that equivalents, alternatives, and modifications, aside from those expressly stated, are possible and within the scope of the appending claims.

What is claimed is:

1. A resonant converter comprising:
   a resonant converter primary stage including:
      a first switch;
      a second switch coupled in series with the first switch;
      a controller coupled to the first switch and the second switch and programmed to control operation of the first switch and the second switch;
      a first transformer comprising a primary coil coupled to a node between the first switch and the second switch; and
      a resonant inductor coupled to the primary coil of the first transformer;
   a resonant converter secondary stage including:
      a second transformer comprising:
         a primary coil coupled to the resonant inductor; and
         a secondary coil comprising a first coil section and a second coil section coupled to the first coil section;
      a third switch coupled to the first coil section of the secondary coil of the second transformer; and
      a fourth switch coupled to the second coil section of the secondary coil of the second transformer; and
   a switch drive circuit configured to drive the third switch and the fourth switch for synchronous rectification, wherein the switch drive circuit comprises a secondary coil of the first transformer.

2. The resonant converter of claim 1 wherein the primary coil of the first transformer is integrated with the resonant inductor.

3. The resonant converter of claim 2 wherein the primary coil of the first transformer is integrated with the resonant inductor in a split bobbin arrangement.

4. The resonant converter of claim 1 wherein the switch drive circuit further comprises:
   a voltage follower circuit including an input coupled to the secondary coil of the first transformer and an output;
   an inverting amplifier circuit including an input coupled to the output of the voltage follower circuit and an output;
   a first comparator circuit for driving the third switch, wherein the first comparator circuit is coupled to the output of the inverting amplifier circuit; and
   a second comparator circuit for driving the fourth switch, wherein the second comparator circuit is coupled to the output of the inverting amplifier circuit.

5. The resonant converter of claim 4 wherein the first comparator circuit of the switch drive circuit comprises an operational amplifier and the second comparator circuit of the switch drive circuit comprises an operational amplifier, with each operational amplifier comprising a non-inverting input and an inverting input.

6. The resonant converter of claim 5 wherein the non-inverting input of the operational amplifier of the first comparator circuit is coupled to the output of the inverting amplifier circuit; and
   wherein the inverting input of the operational amplifier of the second comparator circuit is coupled to the output of the inverting amplifier circuit.

7. The resonant converter of claim 1 wherein the first transformer is an air core transformer.

8. The resonant converter of claim 1 wherein the first transformer is a current transformer.

9. The resonant converter of claim 1 further comprising:
   a first diode coupled in parallel with the first switch and a second diode coupled in parallel with the second switch and in series with the first switch; and
   a capacitor coupled in parallel with the second diode.

10. A method for synchronous rectification in a resonant converter, the method comprising:
    providing a resonant converter primary stage comprising:
       providing a primary pair of switches;
       coupling a controller to the primary pair of switches, the controller configured to control operation of the primary pair of switches;
       coupling a primary coil of a current transformer to the primary pair of switches; and
       coupling a primary coil of a voltage transformer to the current transformer;
    providing a resonant converter secondary stage comprising:
    providing a secondary coil of the voltage transformer; and
    coupling a pair of secondary switches to the secondary coil of the voltage transformer;
    coupling a switch drive circuit to the pair of secondary switches, the switch drive circuit comprising a secondary coil of the current transformer;
    providing power to the resonant converter primary stage; and
    controlling the primary pair of switches with the controller to direct power through the primary coil of the current transformer and the primary coil of the voltage transformer;
    wherein the power flowing through the primary coil of the voltage transformer causes power to flow through the secondary coil of the voltage transformer;

wherein the power flowing through the primary coil of the current transformer causes power to flow through the secondary coil of the current transformer; and wherein the power flowing through the secondary coil of the current transformer causes the switch drive circuit to drive the pair of secondary switches to direct the power flowing through the secondary coil of the voltage transformer to a load.

11. The method of claim 10 wherein coupling a switch drive circuit to the pair of secondary switches comprises:

coupling the secondary coil of the current transformer to an input of a voltage follower circuit;

coupling an output of the voltage follower circuit to an input of an inverting amplifier circuit;

coupling an output of the inverting amplifier circuit to an input of a first comparator circuit; and coupling the output of the inverting amplifier circuit to an input of a second comparator circuit.

12. The method of claim 11 wherein coupling the output of the inverting amplifier circuit to the input of the first comparator circuit comprises coupling the output of the inverting amplifier circuit to an operational amplifier of the first comparator circuit; and wherein coupling the output of the inverting amplifier circuit to the input of the second comparator circuit comprises coupling the output of the inverting amplifier circuit to an operational amplifier of the second comparator circuit.

13. The method of claim 12 wherein coupling the output of the inverting amplifier circuit to the operational amplifier of the first comparator circuit comprises coupling the output of the inverting amplifier circuit to a non-inverting input of the operational amplifier of the first comparator circuit; and wherein coupling the output of the inverting amplifier circuit to an operational amplifier of the second comparator circuit comprises coupling the output of the inverting amplifier circuit to an inverting input of the operational amplifier of the second comparator circuit.

14. The method of claim 10 wherein providing the resonant converter primary stage further comprises coupling an inductor between the primary coil of the current transformer and the primary coil of the voltage transformer.

15. The method of claim 14 wherein providing the resonant converter primary stage further comprises integrating the primary coil of the current transformer with the inductor in a split bobbin arrangement.

16. The method of claim 10 further comprising isolating the resonant converter primary stage from the resonant converter secondary stage and the switch drive circuit.

17. A clamped series resonant converter comprising:

a half bridge circuit comprising a first switch and a second switch coupled in series with the first switch;

a first controller coupled to the half bridge circuit and programmed to control the half bridge circuit;

a pair of diodes coupled in parallel with the half bridge circuit, the pair of diodes comprising a first diode in series with a second diode;

a first capacitor coupled in parallel with the second diode of the pair of diodes;

an inductor coupled to a node between the first switch of the half bridge circuit and the second switch of the half bridge circuit;

a transformer comprising:

a primary coil coupled to the inductor and to a node between the first diode and the second diode; and a secondary coil comprising a first coil section and a second coil section coupled to the first coil section;

a pair of switches including a third switch coupled to the first coil section of the secondary coil of the transformer and a fourth switch coupled to the second coil section of the secondary coil of the transformer;

a first current sensor coupled to the third switch for sensing the current through the third switch;

a second current sensor coupled to the fourth switch for sensing the current through the fourth switch; and a second controller coupled to the first current sensor, the second current sensor, and the pair of switches and programmed to control the pair of switches synchronously with the half bridge circuit based on the current sensed by the first current sensor and the second current sensor.

18. The clamped series resonant converter of claim 17 wherein the third switch of the pair of switches comprises a first metal-oxide-semiconductor field-effect transistor (MOSFET) and the fourth switch of the pair of switches comprises a second MOSFET; and wherein the first current sensor senses the drain to source current for the first MOSFET and the second current sensor senses the drain to source current for the second MOSFET.

19. The clamped series resonant converter of claim 17 wherein the second controller is programmed to turn the pair of switches on and off based on zero current transitions sensed by the first current sensor and the second current sensor.

20. The clamped series resonant converter of claim 17 wherein the second controller is an integrated circuit.

21. The clamped series resonant converter of claim 17 further comprising a second capacitor coupled in parallel with the first diode of the pair of diodes so that the first capacitor and the second capacitor are in a split arrangement.

22. The clamped series resonant converter of claim 17 wherein the primary coil is coupled between the inductor and the node between the first diode and the second diode.

\* \* \* \* \*